(12) United States Patent
Tsukasa

(10) Patent No.: US 6,456,738 B1
(45) Date of Patent: Sep. 24, 2002

(54) METHOD OF AND SYSTEM FOR EXTRACTING PREDETERMINED ELEMENTS FROM INPUT DOCUMENT BASED UPON MODEL WHICH IS ADAPTIVELY MODIFIED ACCORDING TO VARIABLE AMOUNT IN THE INPUT DOCUMENT

(75) Inventor: Kohchi Tsukasa, Kanagawa (JP)

(73) Assignee: Ricoh Company, Ltd., Tokyo (JP)

(*) Notice: Subject to any disclaimer, the term of this patent is extended or adjusted under 35 U.S.C. 154(b) by 0 days.

(21) Appl. No.: 09/353,929

(22) Filed: Jul. 15, 1999

(30) Foreign Application Priority Data

Jul. 16, 1998 (JP) .......................... 10-201824

(51) Int. Cl.⁷ .................................. G06K 9/34
(52) U.S. Cl. ................... 382/175; 382/218; 707/500
(58) Field of Search ..................... 382/175, 181, 382/155, 156, 190, 209, 218, 180; 707/505, 511, 516, 500, 517

(56) References Cited

U.S. PATENT DOCUMENTS

| | | | | |
|---|---|---|---|---|
| 5,592,565 A | * | 1/1997 | Shojima et al. | 382/185 |
| 5,717,940 A | * | 2/1998 | Peairs | 395/777 |
| 5,893,095 A | * | 4/1999 | Jain et al. | 707/6 |
| 5,999,664 A | * | 12/1999 | Mahoney et al. | 382/305 |

FOREIGN PATENT DOCUMENTS

| | | |
|---|---|---|
| JP | 5-159101 | 6/1993 |
| JP | 8-287189 | 11/1996 |
| JP | 11-328306 | 11/1999 |

* cited by examiner

Primary Examiner—Yon J. Couso
(74) Attorney, Agent, or Firm—Knoble & Yoshida, LLC

(57) ABSTRACT

Elements are extracted from an input document image according to a predetermined extraction model. Based upon the variability in a predetermined set of layout characteristics of the extracted elements, the extraction model is adaptively modified to improve future performance in extracting the elements.

18 Claims, 15 Drawing Sheets

FIG. 4

```
<!DOCTYPE page SYSTEM "sample">

<area area_no=0 label="" line=1 num_line=1 xs=2547 ys=4147 xe=2792 ye=4200 size=52 font=0 c_pitch=140>
<line num=0 len=2 c_pitch=140 l_pitch=1 size=48 xs=2551 ys=4151 xe=2788 ye=4199>over</line>
</area>
<area area_no=1 label="TYPE" line=1 num_line=1 xs=1967 ys=315 xe=2804 ye=2804 size=56 font=0 c_pitch=22>
<line num_=1 len=16 c_pitch=22 l_pitch=-1 size=52 xs=1969 ys=316 ye=2800 ye=371>
</area>
<area area_no=2 label="DATE" line=1 num_line=1 xs=2203 ys=419 xe=2792 ye=476 size=56 font=0 c_pitch=33>
<line num=2 len=10 c_pitch=33 l_pitch=-1 size=51 xs=2204 ys=421 xe=2790 ye=472> July 27, 1994</line>
</area>
<area area_no=2 label="DATE" line=1 num_line=1 xs=2203 ys=419 xe=2792 ye=476 size=56 font=0 c_pitch=33>
<line num=3 len=4 c_pitch=55 l_pitch=-1 size=49 xs=316 ys=506 xe=611 ye=555> EACH B *K</line>
</area>
<area area_no=4 label="FROM" line=3 num_line=1 xs=2123 ys=619 xe=2940 ye=684 size=56 font=0 c_pitch=20>
<line num=4 len=15 c_pitch=20 l_pitch=-1 size=52 xs=2126 ys=621 xe=2939 ye=676>
</area>
```

FIG. 8

ELEMENT "A" DISTANCE VALUES
HISTORICAL INFO. + VARIABLE AMOUNT

| DOCUMENT No. | COORDINATE | FONT SIZE | CHARACTER PITCH | INDENT | FONT | ... |
|---|---|---|---|---|---|---|
| 1 | 5 ... 3 | 0 ... 0 | 0 ... 0 | 0 ..... | -1 ..... | : : |
| 2 | | | | | | |
| . | | | | | | |
| M | | | | | | |
| VARIABLE AMOUNT | →X | →Y | →Z | | | |

EXTRACTING CANDIDATE LINES
CORRESPONDING TO EACH ELEMENT

ELEMENT " AUTHOR " : ( a0, a1, . . . ., am )
CANDIDATE $\ell$ 1 : ( b0, b1, . . . ., bm )

0 : COORDINATE
1 : CHARACTER SIZE
2 : FONT
3 : INDENT
  . . . . .
m : . . . . .

RANKING ORDER
FOR COORDINATE

| 1st | 20 |
| 2nd | 18 |
| 3rd | 14 |
| ⋮ | |
| 6th | 8 |
| ⋮ | |

RANKING TABLE FOR
CHARACTER SIZE

| 1st | △ △ |
| 2nd | X X |
| ⋮ | ⋮ |

FIG. 13

ELEMENT A VARIABLE AMOUNT HISTORICAL INFO.

| DOCUMENT No. | COORDINATE | CHARACTER SIZE | CHARACTER PITCH | INDENT | FONT | ... | EXTRACTION CONFIDENCE S | ADJACENT AREA SIMILARITY VALUE $S_n$ | RELATIVE COORDINATE INDEX P |
|---|---|---|---|---|---|---|---|---|---|
| 1 | 1 | 0 | 0 | 0 | −1 | ... | 98 | 90 | 85 |

LAYOUT CHARACTERISTIC DISTANCE VALUES

FIG. 14

DISTANCE VALUES FOR ELEMENT B

| DOCUMENT No. | CHARACTERISTIC DISTANCE VALUE | | | | | | S | Sn | P |
|---|---|---|---|---|---|---|---|---|---|
| 1 | 0 | 0 | · · · | 0 | | | 98 | 10 | 90 |
| 2 | 1 | 0 | · · · | 0 | | | 100 | 15 | 90 |
| 3 | 0 | 0 | · · · | 0 | | | 100 | 13 | 95 |
| · · · · · | | | | | · · · · | | · · · · | · · · · | · · · · |

BEFORE UPDATE

| 1st | 20 |
|-----|----|
| 2nd | 18 |
| ⋮ | ⋮ |
| 6th | 8 |
| ⋮ | ⋮ |

AFTER UPDATE

| 1st | 10 |
|-----|----|
| 2nd | 9 |
| ⋮ | ⋮ |
| 6th | 5 |
| ⋮ | ⋮ |

METHOD OF AND SYSTEM FOR EXTRACTING PREDETERMINED ELEMENTS FROM INPUT DOCUMENT BASED UPON MODEL WHICH IS ADAPTIVELY MODIFIED ACCORDING TO VARIABLE AMOUNT IN THE INPUT DOCUMENT

FIELD OF THE INVENTION

The current invention is generally related to a method of and a system for extracting elements from document, and more particularly related to adaptively modifying model data for extracting the elements.

BACKGROUND OF THE INVENTION

In prior attempts of extracting elements from documents, a number of models has been considered. For example, Japanese Patent Laid Publication Hei 8-287189 disclosed that a user prepares a set of extraction rules for extracting certain format information as well as a set of document formats. Based upon the extraction rules, predetermined certain elements containing the desired information are extracted from an input document image. However, since the extraction rules are precise for a particular document type, for each new document type, a new set of extraction rules must be implemented. Similarly, for any modification to an existing document type, the existing extraction rules must be also modified.

Another exemplary attempt includes Japanese Patent Laid Publication Hei 5-159101, which discloses a graphical representation scheme. An input document is broken down to elements, and the relative positional relationships among these elements are represented by a graphically linked model. Because of reliance on the relative positional relationships among the elements, when there is a mismatch with a single element, the remaining elements are also likely mismatched.

In the above-described matching prior attempts, it is assumed that for a given input document type, there is not a significant amount of variation in each element. For example, even if the same document type is used, font may be different for certain input documents. One reason may be that the input documents have been printed by more than one printer. Such variations may be a source for causing an error in extracting specified elements from a given input type. In this regard, Japanese Patent Application Hei 10-145781 has disclosed a method of and a system for updating a characteristic value of an element in an extraction model when a variable amount between the extracted characteristic value and the model characteristic value is beyond a predetermined threshold value. However, this simplistic approach turns out to be too susceptible to noise in the input documents. In order to substantially reduce errors in extracting elements, the criteria or extraction rules need to be intelligently adaptive enough to accommodate variations as well as noises.

SUMMARY OF THE INVENTION

In order to solve the above and other problems, according to a first aspect of the current invention, a method of extracting one or more elements from a document using model data, the model data including at least a template, includes: a) determining the template for a predetermined document type, the template having a set of predetermined characteristics for each of the elements; b) inputting at least one input document; c) extracting the elements having the predetermined characteristics from the input document according to the model data; d) storing the extracted characteristics of the elements in the model data; e) determining a distance value between the stored characteristics and a corresponding one in the model data; f) determining a variable amount based upon the distance value for each of the element; and g) modifying the model data based upon the variable amount.

According to a second aspect of the current invention, a system for extracting one or more elements from a document using model data, including: a model generation unit for generating model data for a predetermined document type, the model data including at least a template, the template having a set of predetermined characteristics for each of the elements; a document input unit for inputting at least one input document; an element extraction unit connected to the model generator and the document input unit for extracting the elements having the predetermined characteristics from the input document according to the model data; a characteristics storage unit connected to the element extraction unit for storing the extracted characteristics of the elements in the model data; a learning process unit connected to the characteristics storage unit for determining a distance value between the stored characteristics and a corresponding one in the model data and for determining a variable amount based upon the distance value; and a model updating unit connected to the learning process unit and the model generation unit for modifying the model data based upon the variable amount.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 4 illustrates one example of the model or the model data.

FIG. 8 illustrates exemplary distance values in a model in a table format.

FIG. 11A is a table for the point distribution for the rank order of coordinates while FIG. 11B is another table for the point distribution for the rank order of character size.

FIG. 13 is an exemplary table illustrating historic information for an element A.

FIG. 14 illustrates another exemplary table for an element B which contains noise-reducible historical information.

DETAILED DESCRIPTION OF THE PREFERRED EMBODIMENT(S)

Figure 1:
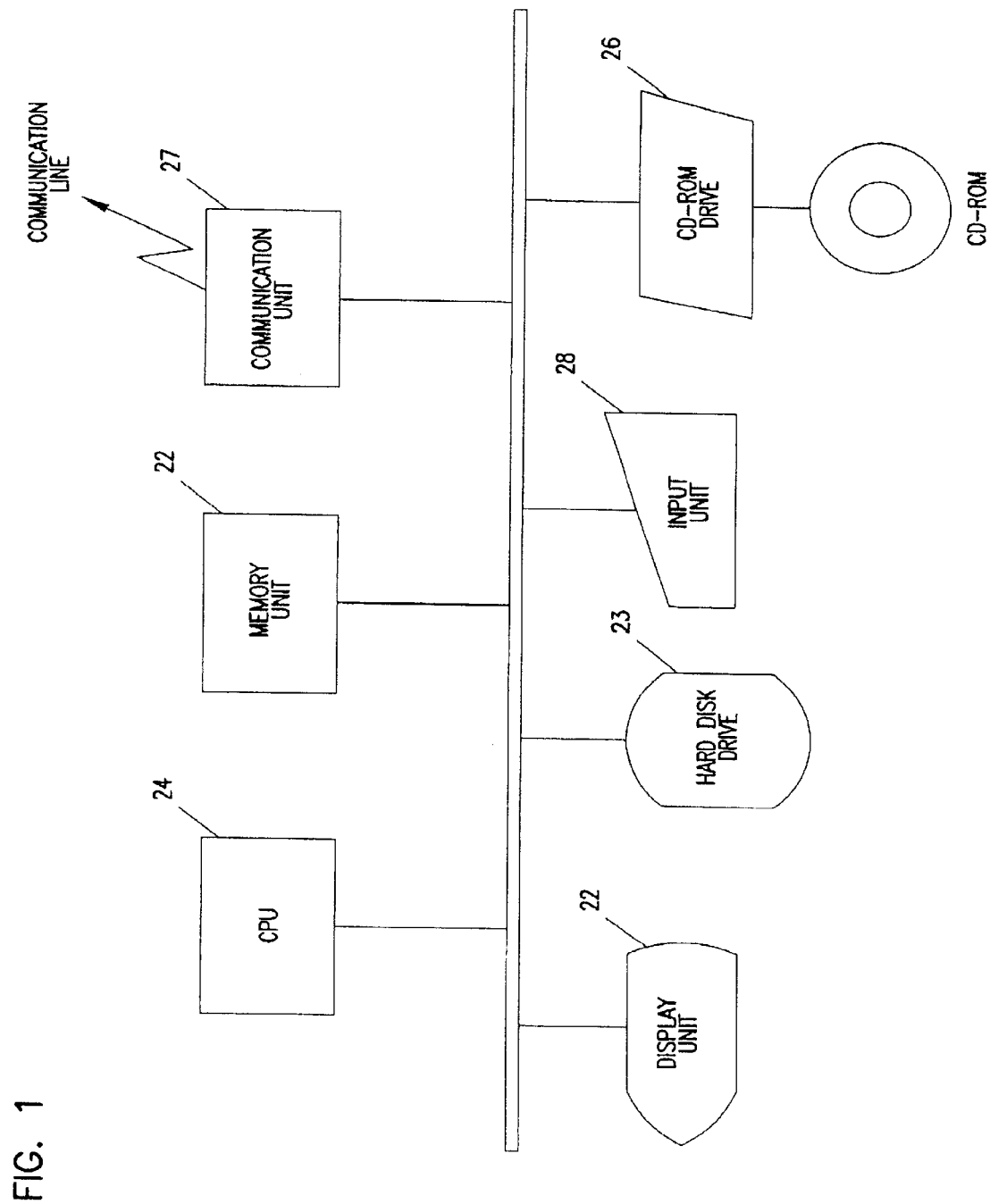
FIG. 1 is a block diagram illustrating one preferred embodiment of the system for adaptively modifying model data according to the current invention.

Referring now to the drawings, wherein like reference numerals designate corresponding structure throughout the views, and referring in particular to FIG. 1, one preferred embodiment of the system for adaptively modifying model data according to the current invention includes a communication unit 27 for transmitting the digital image data to and from one processing unit to another computer over computer network or a communication line. The processing units include an input unit 28 such as a keyboard, storage devices such as a hard disk device 23 and a CD-ROM disk device 26 for storing the digital image data and application programs, a main memory unit 22 and a central processing unit (CPU) 24 for running an application program as well as output devices such as a display monitor 22 for outputting the extracted elements. In general, the application program extracts a set of elements based upon model data, stores the characteristic value of the extracted element in the model data, determines a characteristic distance or similarity between a characteristic value of an extracted element and a corresponding value in the model data, determines a variable amount based upon the characteristic distance and adaptively modifies model data based upon the variable amount.

Figure 2:
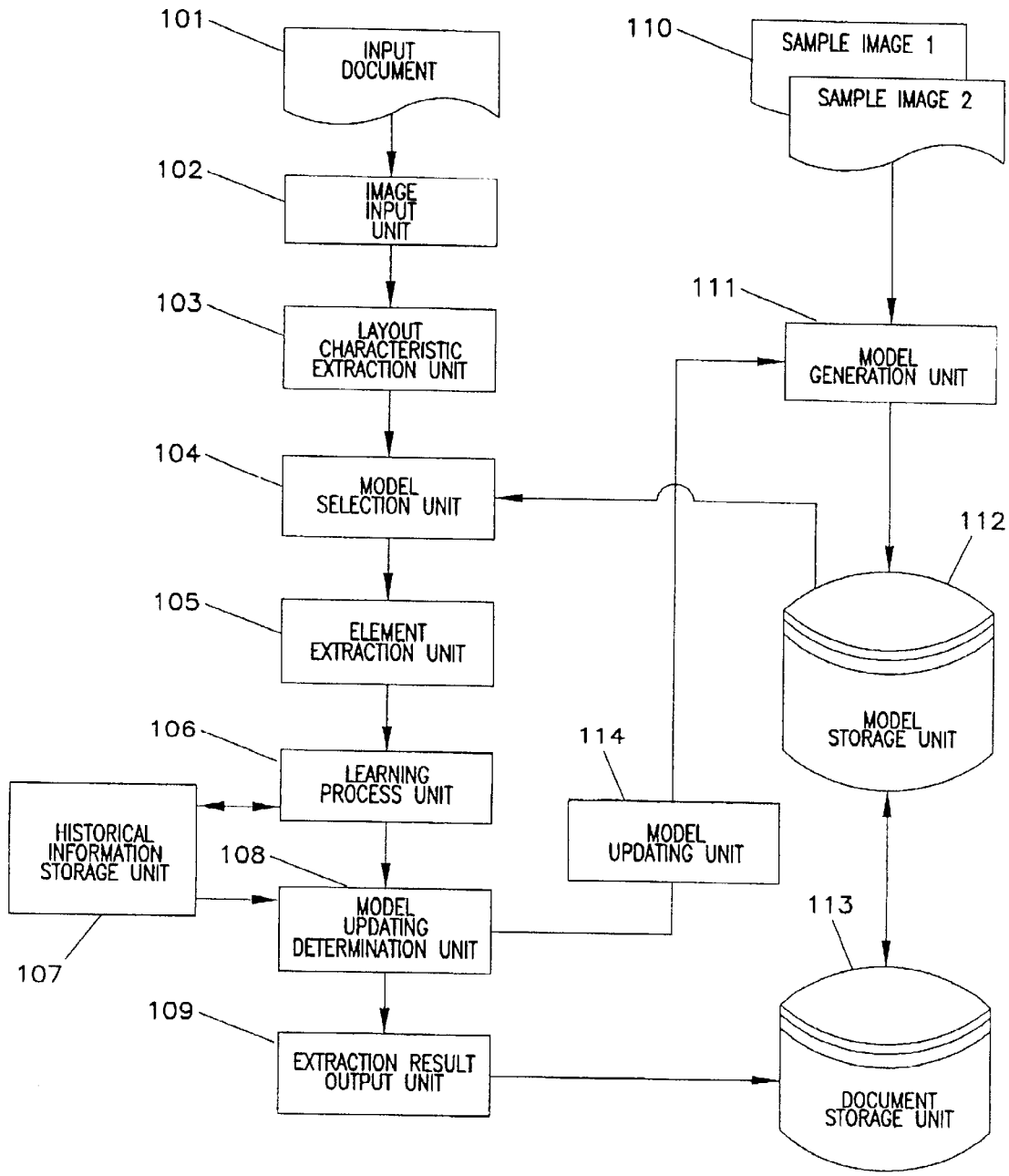
FIG. 2 is a block diagram illustrating a second preferred embodiment of the system for adaptively modifying model data according to the current invention.

Referring to FIG. 2, a second preferred embodiment of the system for adaptively modifying model data according to the current invention is implemented as either software modules or hardware units. In the following, the second preferred embodiment will be described using hardware units. A document input unit 102 such as a scanner inputs documents into the system as digital images. A layout characteristic extraction unit 103 divides the inputted document image into a set of predetermined areas of text lines using minimal circumscribing rectangles. The text lines are further divided into characters by minimal circumscribing rectangles in order to determine certain layout characteristics such as a character size and a pitch size. The layout characteristics unit 103 also extracts certain other layout characteristics such as the coordinates of the text line, indentations, font types, columnar formats and so on. A set of the layout characteristics is organized into a template, and a set of templates is organized into an extraction model or model data. To maintain accuracy of the coordinates among inputs having a different margin size, the axes are chosen with respect to the above-described minimal circumscribing rectangles rather than the input image size which contains blank margins surrounding the text line areas. To increase the accuracy of the extraction from text written in a vertical direction as in the Japanese language, the text direction is also determined. The above layout characteristic information is stored in memory and files in coded data with tags. Among the inputted document pages, if the above described layout characteristic information is available on a cover page or a first page, the rest of the pages in the inputted image is generally ignored.

Based upon the extracted layout characteristics, a model selection unit 104 selects one of a plurality of predetermined extraction models which is stored in a model storage unit 112. These extraction models or model data have been previously generated for each of a set of predetermined document types. A model generation unit 111 associates user-defined name and a characteristic to each of a plurality of elements in sample images 110. For example, the characteristics for an element includes a maximal number of lines. Although the characteristic is not necessary for each element, a layout characteristic is generally included. A set of the layout characteristics and the characteristics is organized into a template, and a set of templates is organized into an extraction model or model data. In general, the above described model is maintained without substantially complex tasks since no structure is maintained for graphically representing the elements. To select one of the models, the model selection unit 104 determines whether or not each of the extracted layout characteristics is substantially similar to the corresponding one of the stored layout characteristics of the stored model. When the degree of similarity between the best candidate layout characteristic and one of the stored layout characteristic is above a predetermined threshold value, and an amount of difference in the similarity degree between the best layout characteristic candidate and a next-to-best layout characteristic candidate is sufficiently large, the best suited extraction model is accordingly selected.

Still referring to FIG. 2, an element extraction unit 105 extracts elements or areas containing layout format information from an input image according the selected best model. These element areas are extracted based upon the layout information stored in the selected best model. For example, the element extraction unit 105 extracts a predetermined number of potential candidates for each element from the same input image based upon the comparison of the coordinates of the minimal circumscribing rectangles, the font sizes, and the number of the lines. A learning process unit 106 then determines for each element a distance in layout characteristics between the selected model and an input image. The learning process unit 106 stores the above distance value for each element from a plurality of input images as historical information in a historical information storage unit 107. The distance information is considered to be a part of the model data. Based upon the above described historical information, the learning process unit 106 determines a variable amount or variance for each element. The variable amount of a particular layout characteristic for a given element indicates how variable the particular layout characteristic for the given element is among the input images. Furthermore, the learning process unit 106 determines a noise reduction potential index based upon the variable amounts.

A model updating unit 114 updates the selected extraction model by expanding a capacity range of a layout characteristic when a model updating determination unit 108 determines that the corresponding variable amount of the layout characteristics exceeds a predetermined layout characteristic threshold value. In certain situation, if the model updating determination unit 108 determines that the variable amount is too large beyond the predetermined layout characteristic threshold value, the model updating unit 108 newly adds a template in the same extraction model to generate a multi-template model rather than expanding the capacity of a layout characteristics. On the other hand, when the model updating determination unit 108 determines that the variable amount of the layout characteristics is within a certain range and the noise reduction potential index exceeds a predetermined threshold value, the model updating unit 114 also updates the selected extraction model by reducing a capacity range of the corresponding layout characteristics as well as modifying associated parameter values. The narrowing of the capacity range generally reduces the noise level of a corresponding layout characteristic. Lastly, when the model updating determination unit 108 determines that the corresponding variable amount of the layout characteristics neither exceeds the predetermined layout characteristic threshold value nor falls with the certain range, an extraction result output unit 109 outputs the extracted layout areas to a document storage unit 113.

Figure 3:
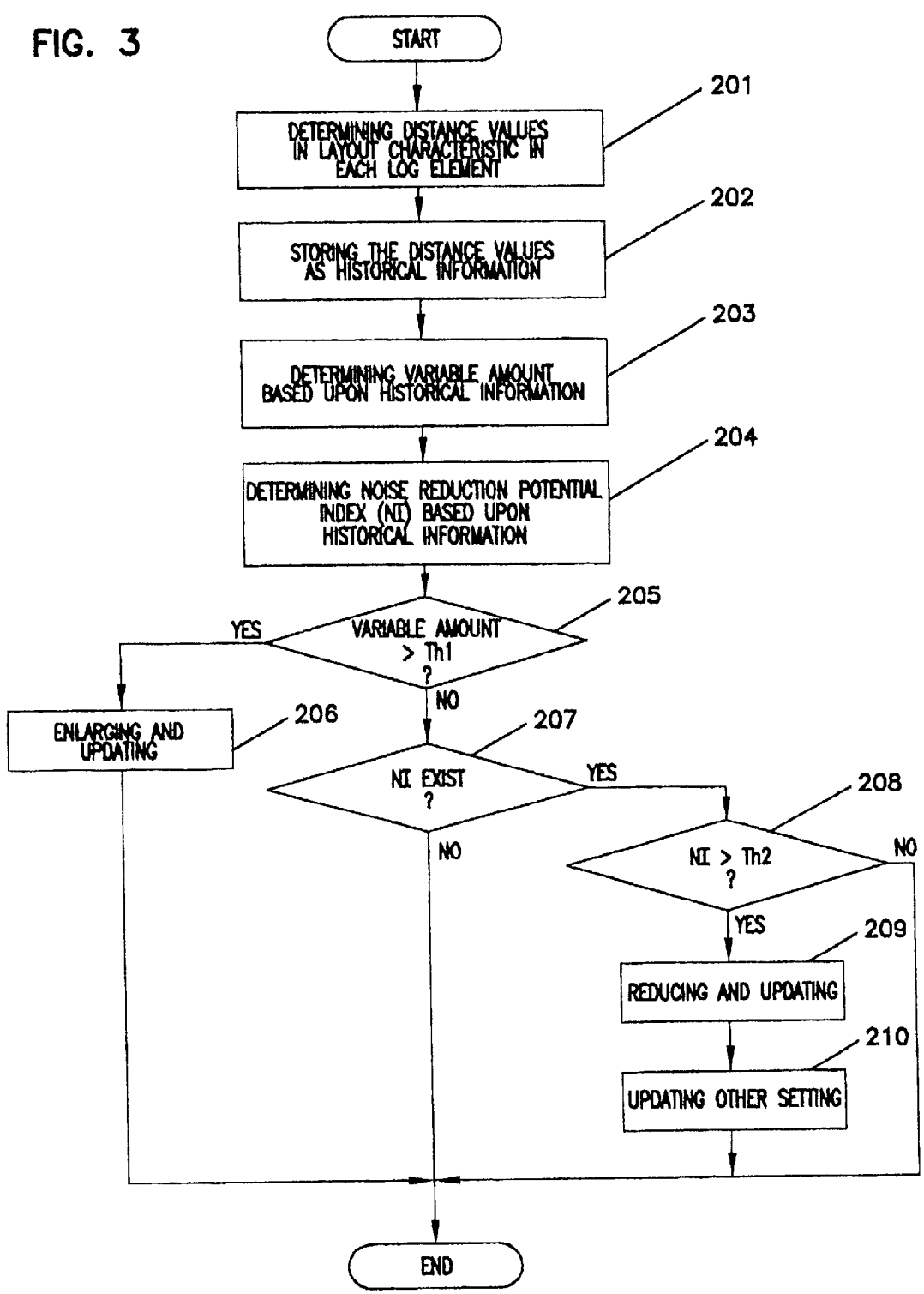
FIG. 3 is a flow chart illustrating a preferred process of adaptively modifying model data according to the current invention.

Now referring to FIG. 3, a preferred process of adaptively modifying model data according to the current invention generally includes acts for determining variable amount or variance and modifying the model based upon the variable amount. Some of these acts will be described in relation to the units or components as already described with respect to FIG. 2. In act 201, the learning process unit 106 determines for each element a distance in layout characteristics between the selected model and an input image, and the distance is an index for indicating a difference in the layout characteristic value between the selected model and the input image. In act 202, the distance of a predetermined set of layout characteristic for each element is additionally stored in the existing distance database in the historical information storage unit 107. To update the selected model, in act 203, the learning process 106 determines the variable amount based upon the distance information for each layout characteristic stored in the historical information storage unit 107. Subsequently, in act 204, the noise reduction potential index NI is determined based upon the variable amount determined in the act 203. According to the model updating determination unit 108, if the variable amount of a layout characteristic exceeds a corresponding predetermined threshold value Th1 in act 205, a capacity range of the corresponding layout characteristic is expanded in act 206. For example, a range capacity of one layout characteristic such as the font size is expanded from 9-point to 13-point. On the other hand, if the model updating determination unit 108 determines that the variable amount of a layout characteristic fails to exceed a corresponding predetermined threshold value Th1 in the act 205 and that the noise reduction potential index NI exceeds a predetermined threshold value Th2 in acts 207 and 208, a capacity range of the corresponding layout characteristic is reduced in act 209. Using the same example as above, the font size is changed from 10-point to 8-point. In order to avoid undesirable model data modifications based upon a small number of input samples, the noise reduction potential index NI is provided to effectively increase the reliability of the variable amount which is determined based upon a small number of input samples.

Referring to FIG. 4, one example of the model or the model data is illustrated. The model data includes data including a code value with an associated tag and is stored in a model storage unit 112 as shown in FIG. 2. In this example, a first line of the model data indicates a document type such as DTD as in the SGML. A second line includes information on the entire image area such as printed area boundaries and a number of sub-areas. From a third line on, for each area, layout characteristic is appended as a tag and includes user-defined as well as layout characteristic information on a layout item name, a maximal number of lines, a number of lines, coordinate values, a font size, a font type and a character pitch value.

Figure 5:
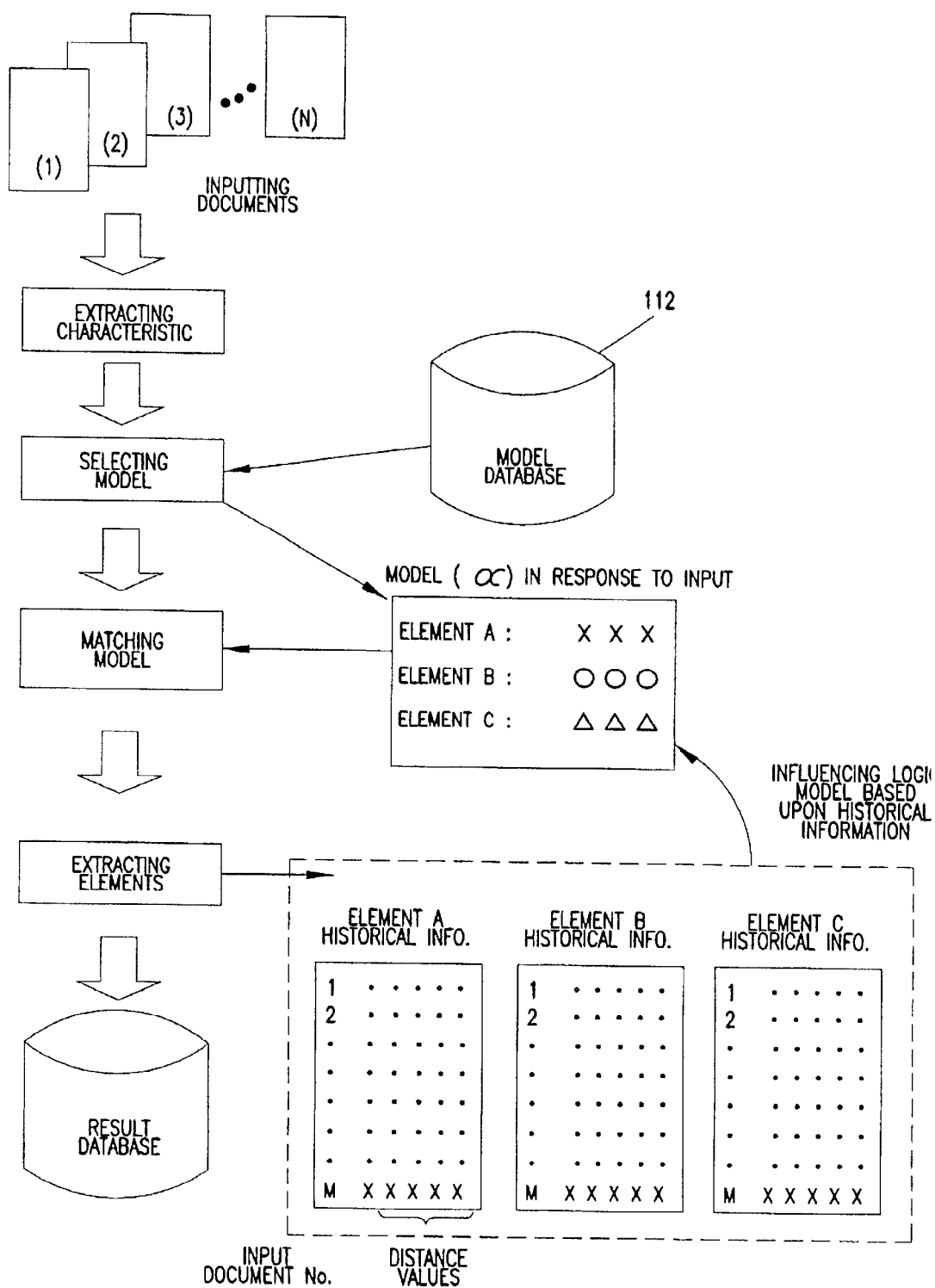
FIG. 5 illustrates the distance determination process and contents of the associated databases.

Now referring to FIG. 5, the distance determination process is illustrated. This determination process is also called a historical information generation process. Input images (1) through (n) are inputted, and for each input image, the above described characteristics and or the layout characteristics are extracted. Based upon the above extracted characteristics, an appropriate or the most close model (α) is selected from a model database or a model storage unit 112. After the model (α) is selected, each defined element in the model (α) is used to match a corresponding element in the input image. Then, layout characteristics of the matched elements are extracted. Based upon the extracted layout characteristics, a distance in each layout characteristics is determined, and the distance is an index for indicating a difference in the layout characteristic value between the selected model and the input image. For example, for an element A, the layout characteristics for the corresponding element are extracted from each of input documents 1 through M. These extracted layout characteristics values are compared to the corresponding layout characteristic values in the selected model to determine a distance value or a difference between the two values. The distance values are shown as dots, and each column as circled contains a series of distance values for the same layout characteristics for the element A. These distance values are a part of the selected model as historical information and ultimately stored in the model database or storage unit 112.

Figure 6:
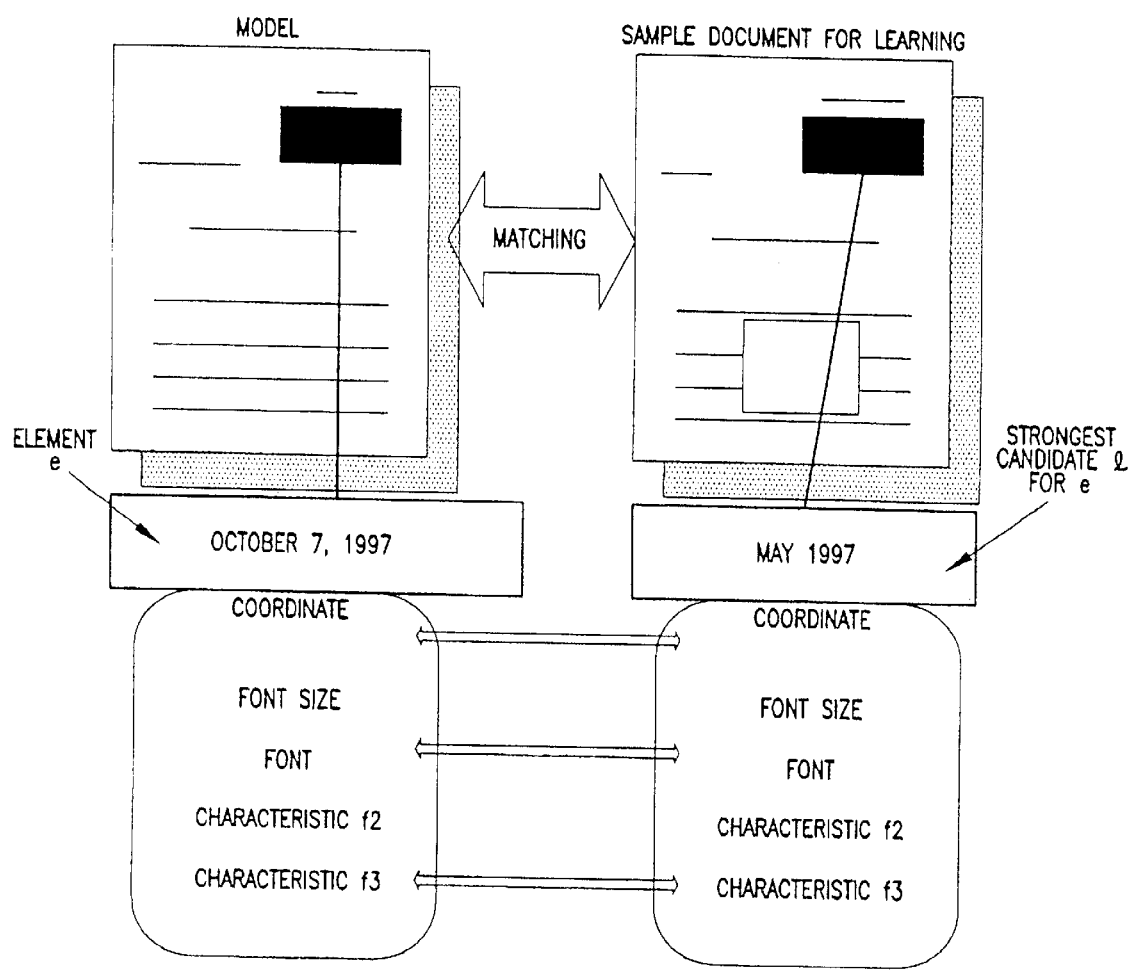
FIG. 6 illustrates some aspects of a model and a matching act.

To generate the above illustrated model data, an example is provided in FIG. 6. An element e in a model contains information on date and is located at the top of the document as shown in a solid box. The date information in the element e is blown underneath the document model and includes the month, the date and the year. The element e is defined by at least five characteristics, including coordinates, a font size, font type, a predetermined characteristic function f2, and a predetermined characteristic function f3. To find a corresponding element in a sample document, the model is matched with the sample document. The five layout characteristics are compared between the model element e and the best candidate element l to determine the distance values.

Figure 7:
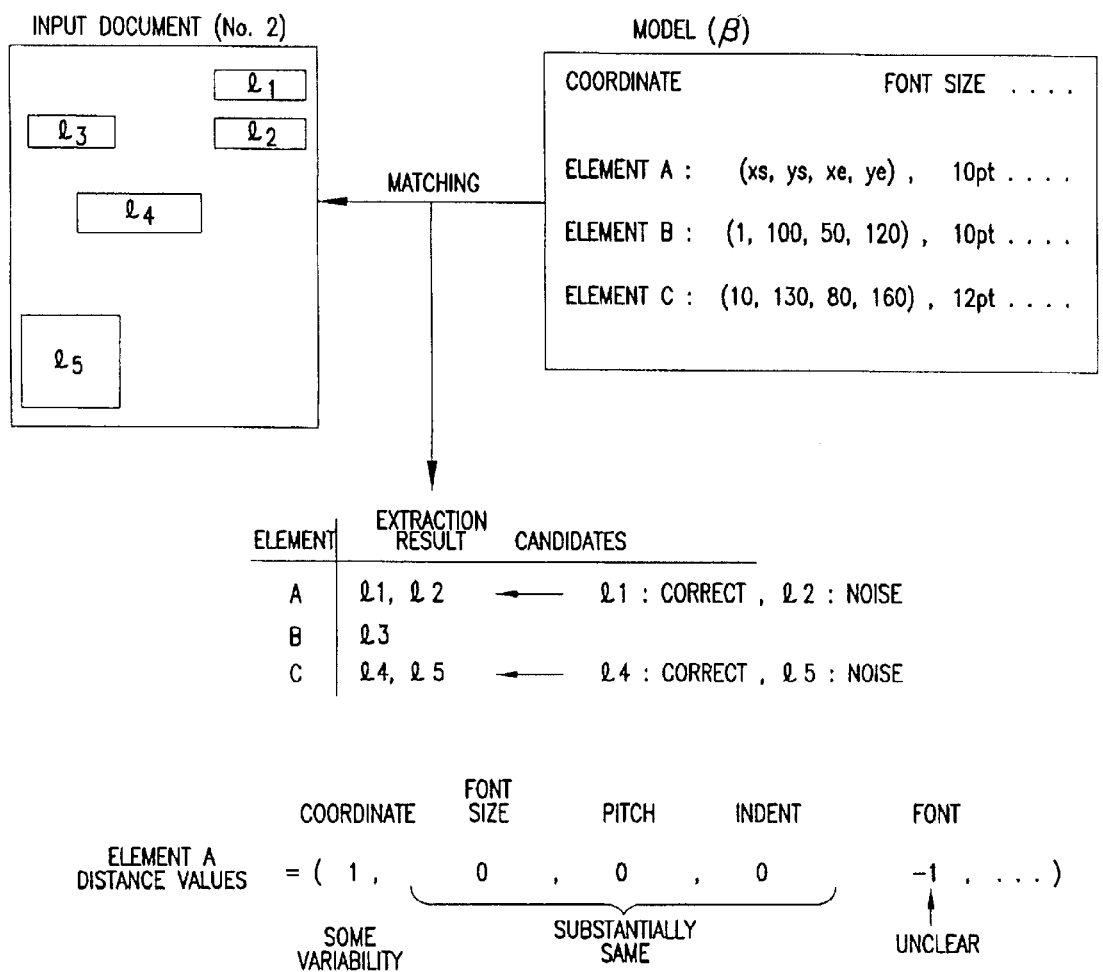
FIG. 7 illustrates acts involved in a preferred process of selecting the best candidate.

Now referring to FIG. 7, a process of selecting the best candidate is generally described. A sample input document image No. 2 contains candidate areas or lines 11 through 15. A selected model β contains a predetermined number of layout characteristics for each element. This exemplary model β contains elements A, B and C, and each element includes at least coordinates and a font size. The coordinates indicate the upper left corner position and the lower right position of a minimal circumscribing rectangle. The font size indicates a number of point for indicating the character size. In this example, it is assumed that the elements A, B and C respectively most closely match the candidates 11, 13 and 14. To find a best match for the element A, the layout characteristics for the element A in the model β are used find candidate lines. As a result of the matching attempt for the element A, the candidates 11 and 12 are extracted from the input document No. 2. Similarly, for the element C, the candidates 14 and 15 are extracted. However, for the element B, only the candidate 13 is extracted. For the elements A and C, since more than one element is extracted, the best candidate or a correct candidate must be selected. In order to determine the best or correct candidate, the distance values are determined.

Now referring to FIG. 8, the distance values in a model are further illustrated in a table format. A separate table is allocated for each element of a template in the selected model. In the most left column, document numbers are stored, and the document numbers each indicate a separate input image. For each input image, distance values for a predetermined set of layout characteristics are stored, and the layout characteristics includes coordinates, a font size, a character pitch, indentation and a font type. For example, there is a distance value of 5 in coordinates of an element A in the document image number 1 and those of an element A in the selected model. On the other hand, there is no substantial difference or a distance value of 0 in the font size, the character pitch and indent of an element A in the document image number 1 and those of an element A in the selected model. Lastly, a difference value of −1 is used to indicate that the distance value is not clearly determined. In the same example, a distance value for the font type is not clearly determined. For each column of a particular layout characteristic, a variable amount for the layout characteristics is determined among the m number of input documents.

Figure 9:
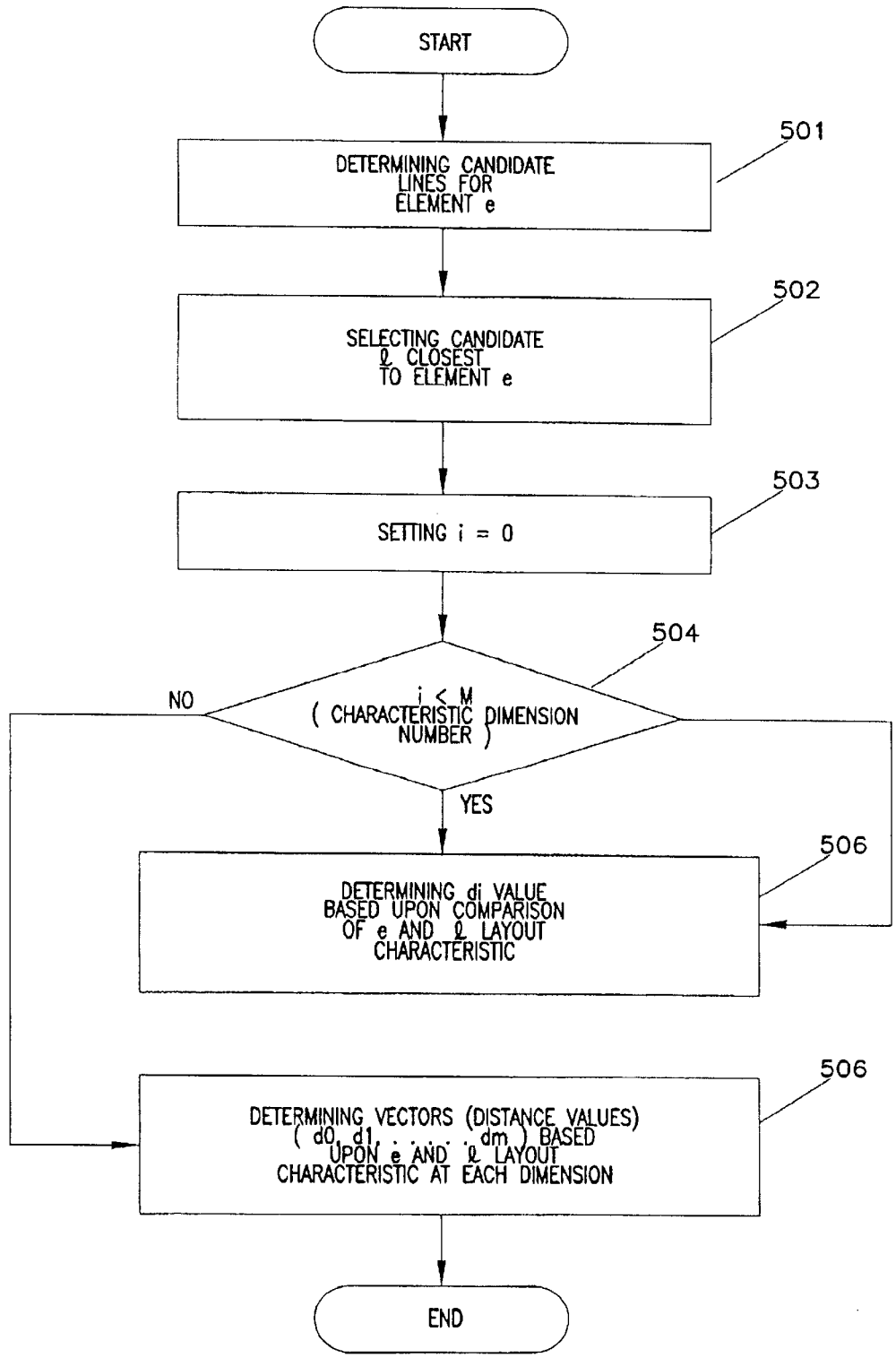
FIG. 9 is a flow chart illustrating acts involved in a preferred process of determining the distance values.

FIG. 9 is a flow chart for illustrating acts involved in a preferred process of determining the above described distance values. Assuming that an element e has m layout characteristics, the element e is defined by m functions ($f_0^e$, $f_1^e, \ldots, f_m^e$) each function defining a layout characteristics. In act 501, candidates for an element e are selected from an input image. Among the selected candidates, the best candidate l is selected in act 502 based upon a comparison of corresponding information for an element e between the selected model and each of the candidates. The best candidate is also defined by m functions ($f_0^l, f_1^l, \ldots, f_m^l$) each function defining a layout characteristics corresponding to those of the element e. In act 503, a counter i is initialized to 0 before comparing it to a predetermined maximal number M of layout characteristics in act 504. If the counter i has not yet reached the maximal number M, a difference value di for the i th layout characteristics is determined based upon the comparison of the corresponding i th layout characteristic between the best element candidate l and the model element e in act 505. The preferred process then returns to the act 504 for further process. On the other hand, if the counter i has reached the maximal number M in the act 504, the preferred process now outputs the entire set of difference values d0, d1 . . . dm for every layout characteristics associated with the element e. To summarize, the distance value or vector for the element e and the best candidate l is expressed as follows: d (e, l)=($d_0^e, d_1^e, \ldots, d_m^e$).

The above described preferred embodiments of the process of and the system extracts user-defined elements from an input document based upon the information stored in a model. The information is not limited to coordinates of the elements but also include various layout characteristics. Because of the flexible extraction criteria as specified by the layout characteristics, elements are correctly extracted even if they are variable to a certain extent. On the other hand, when a capacity or a range for the extraction criteria increases, it is more likely to extract erroneous elements due to noise. In order to extract elements with precision, if the input documents of the same document type have certain layout characteristics that vary in a predetermined manner, multiple templates are used to accommodate separate sets of layout characteristics. For example, if a single document type is inputted in two font types such as times new roman and courier, two separate templates for the two font types are generated for the same document type. Thus, when an input text image is in times new roman, a corresponding template is used. Even if the variability in layout characteristics is large, as long as the variability is predictable and stable in patterns, the above described multi-template approach is useful.

Figure 10:
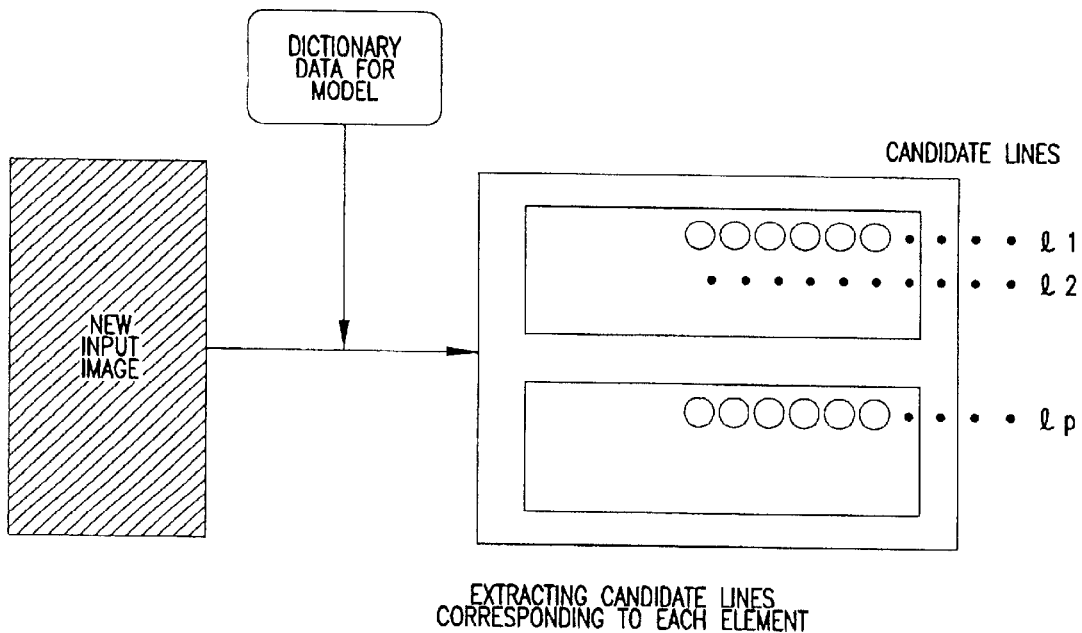
FIG. 10 illustrate the use of an extraction confidence value for assuring proper extraction of the elements.

Now referring to FIG. 10, another way to assure proper extraction of the elements is to use an extraction confidence value. To illustrate how the extraction confidence value is determined, a new input image is now processed to extract an element entitled "author" based upon a predetermined model. In the model, the "author" element is defined by layout characteristics a0 through am. For example, the layout characteristics a0, a1 and a2 are respectively coordinates, a font size and a font type. As a result of the model matching, candidate lines l1 through lp are extracted. The layout characteristics of the candidate line l1 is expressed by b0 through bm. In order to determine the extraction confidence value for the candidate line l1, the distance values d0, d1 . . . dm are determined by calculating the difference between the model layout characteristics a0 through am and the candidate line layout characteristics b0 through bm. In other words, the distance values d0, d1 and dm are respectively a difference between a0 and b0, a1 and b1 and am and bm. Similarly, for other candidate lines l2 through lp, the distance values are determined. After the distance values d0 through dm are determined, points are determined for the order as well as the values of the distance values d0 through dm in order to establish the extraction confidence value.

Figures 11A, 11B:
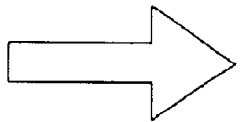

Now referring to FIGS. 11A and 11B, two exemplary ranking tables are illustrated for determining points for a candidate lines based upon the distance value of a given layout characteristics. For each candidate line li (i=0 to m), the points are determined based upon the rank order of a given layout characteristics. Each candidate line li has a total number of points (pri0, pri1, . . . prim). For example, p0 is a number of points given for a ri th rank order of the candidate line li in a coordinate ranking table. Similarly, p1 is a number of points given for the rank order of the candidate line li in a font size ranking table. FIG. 11A is a table for the point distribution for the rank order of coordinates while FIG. 11B is another table for the point distribution for the rank order of character size. For example, for an element "author," based upon the rank order in coordinates of a candidate line li with respect to those of a selected model, points are assigned to the candidate line li according to the coordinate ranking point table. Assuming that the candidate line l1 and the candidate line l3 are respectively ranked first and second, the point p0 for the candidate line l1 is 20 while that for the candidate line l3 is 18 as shown in FIG. 11A. Similarly, the point p1 ri is determined according to the character size ranking point table.

In order to use the distance values d0 through dm in determining an extraction confidence value, the distance values d0 through dm are normalized since these values are not of the same characteristics. The normalized distance values are denoted by s0 through sm, and an i th normalized distance value Si is determined as follows:

$$si = \frac{|di - mi|^2}{vi}$$

where di is an i th distance value, mi is an i th average and vi is an i th variance. Finally, an extraction confidence value S for an element e for an i th candidate line li is determined by the following equation:

$$S(e) = \sum_{i=0}^{m} (pri, i + si)$$

In addition to the above described extraction confidence value S, a noise reduction potential index NI is determined to substantially reduce noise from an extracted element e. As discussed before, as a range or a tolerance for extracting an element is increased based upon a variable amount of the distance values, it is likely that a noise level in the extraction process is also increased. The noise reduction potential index NI improves the quality of the increased extraction capacity or tolerance level. In general, the noise reduction potential index NI is primarily determined by a variable amount of an element e and a fact whether or not lines adjacent to the element e are similar to the element e.

Figure 12:
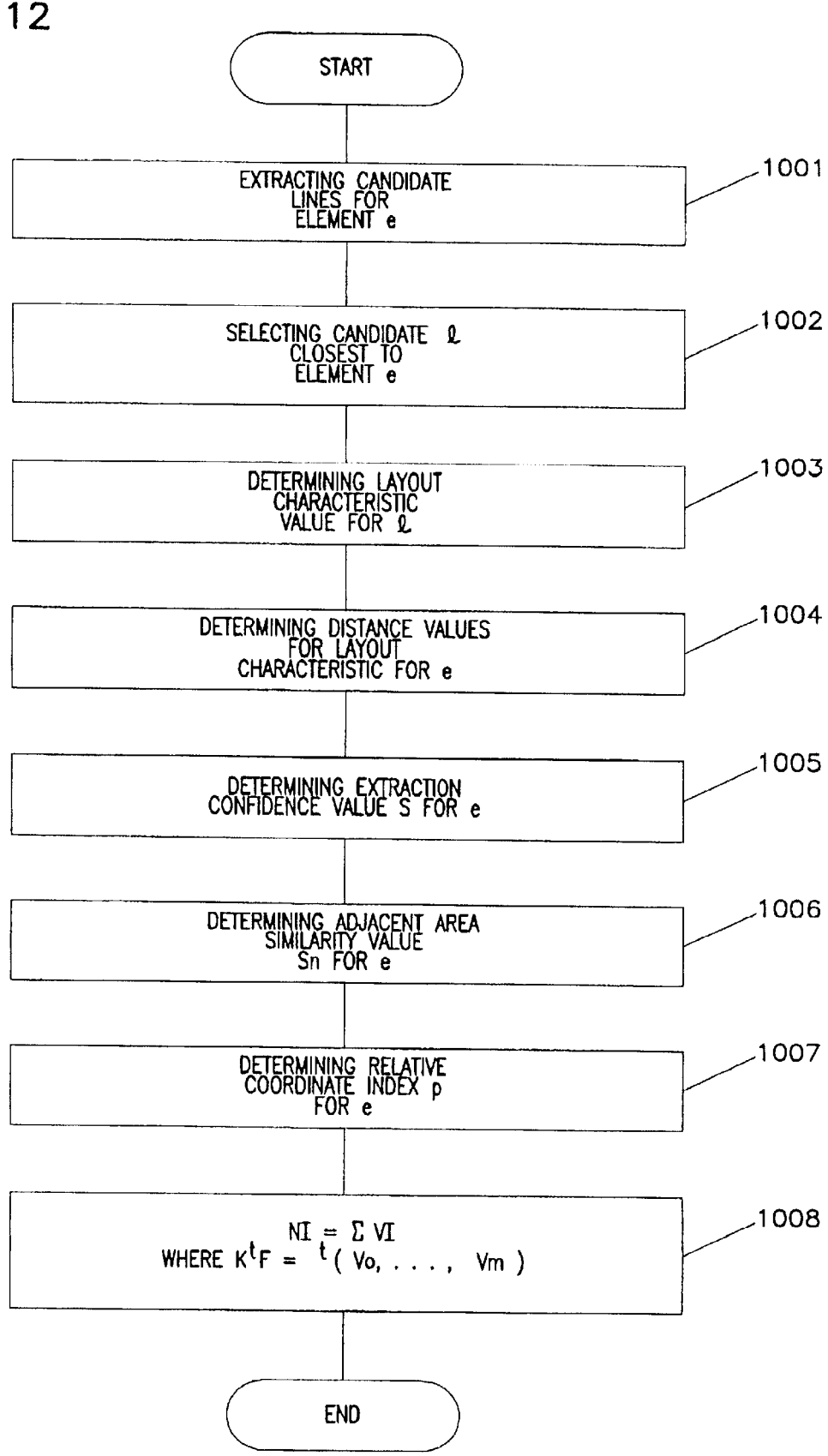
FIG. 12 is a flow chart illustrating acts involved in a preferred process of determining a noise reduction potential index NI.

Now referring to FIG. 12, acts involved in a preferred process of determining the above described noise reduction potential index NI are illustrated.

Candidates lines are extracted for an element e in act 1001, and the best candidate l is selected from the candidate lines in act 1002. In act 1003, a set of predetermined layout characteristics for the best candidate line l is determined. These m layout characteristics f for the candidate line l are designated by the following:

$$f'=(f_0', f_1', \ldots, f_m')$$

In act 1004, m distance values d0 through dm of the element e are determined with respect to the above layout characteristics of the candidate line l. In other words, d(e, l)=d0, d1, . . . , dm). In general, when the distance values are large, it is difficult to reduce noise and input data is processed to avoid extraction failures. On the other hand, when the distance values are small, it is possible to further reduce noise. In act 1005, an extraction confidence value S(e) for an element e is determined as described above. In general, when the extraction confidence value S(e) is large, the extraction process is reliable while extraction confidence value S(e) is small, the extraction process is not reliable. The data with the small extraction confidence value S(e) is not generally suited for historical information. In act 1006, an adjacent area similarity degree Sn is determined. If there is a similar area next to the element e, it is generally difficult to properly extract an element and to avoid noise. On the other hand, if there is no similar area, it is possible to reduce noise. Next, a relative coordinate index p is determined for an element e with respect to a printable text area in act 1007. The value of the relative coordinate index p is high when the element e appears near an edge of a page since the independence of the element is distinctive with respect to other elements. In contrast, the value of the relative coordinate index p is low when the element e appears near the center of a page since the independence of the element is not distinctive with respect to other elements. In general, it is more difficult to reduce the noise when the relative coordinate index is low. Lastly, in act 1008, the noise reduction potential index NI is determined by the following equation:

$$NI = \sum_{i=0}^{m} ui$$

where F is expressed by the following m-th degeree vector:

$$F=(d(e, l), f', S(e), Sn(e), p(e))$$

K is a m-by-m noise reduction potential index matrix. Since the above m parameters cannot be directly compared with each other, these parameters are normalized or weighted by the matrix K. The parameters $u_0, \ldots, u_m$ are the result of the normalization by the matrix K.

$u_0, \ldots, u_m$ $$K = \begin{pmatrix} t_0 & & & & & \\ & t_1 & & & & 0 \\ & & \ddots & & & \\ & & & t_{m-3} & & \\ & & & & t_{m-2} & \\ & 0 & & & & t_{m-1} \\ & & & & & & t_m \end{pmatrix}$$

If the first m-3 elements on a diagonal line in the matrix K are set to having a value zero (i.e., $t_0=t_1 \ldots =t_{m-3}=0$), the normalized parameters $u_0=u. \ldots =u_{m-3}=0$. As a result of the above described values in the matrix K, the noise reduction potential index NI is essentially determined by $u_{m-2}$, $u_{m-1}$ and $u_m$. In other words, the noise reduction potential index NI is substantially determined by the extraction confidence value S(e), the adjacent area similarity degree Sn(e) and the relative coordinate index p(e). In general, the noise reduction potential index NI and the adjacent area similarity degree Sn(e) is inversely related while the noise reduction potential index NI and the extraction confidence value S(e) as well as the relative coordinate index p(e) are positively related. To determine, the last three elements on the diagonal line of the matrix K, the following relations are used: $0<t_m<t_{m-2}$; $t_{m-1}<0$. In this regard, if the adjacent area similarity degree Sn is large (i.e., a similar area exists near the element e), it is usually difficult to reduce noise, the matrix K can be adjusted to cause the noise reduction potential index NI to become small. On the other hand, if the distance values di of the layout characteristics are relatively small, the extraction confidence value S(e) is relative large, the adjacent area similarity degree Sn is very small, and the element e is located near an edge, the matrix K is adjusted to cause the noise reduction potential index NI to exceed a predetermined threshold value for updating the model by restricting the capacity or modifying the parameters.

Now referring to FIG. 13, an exemplary table illustrates historic information for an element A. The exemplary table includes the distance values for a predetermined number of layout characteristics such as coordinates, the character size, the character pitch, indentation, the font and so on. In addition to these layout characteristics, the extraction confidence value S, the adjacent area similarity value Sn and a relative coordinate index p are also stored for the element A in a document number 1. In this example, the extraction confidence value S(A) is relatively high, and Sn is also high since the lines l1 and l2 are adjacent. The relative coordinate index value p is also high since the candidate line l1 is located near the edge.

FIG. 14 illustrates another exemplary table for an element B which contains noise-reducible historical information. The information as a whole, the characteristic distance values are small while the extraction confidence value S(e) is relatively high. Furthermore, the adjacent area similarity value Sn is relative small, and the relative coordinate index p is high. Thus, this exemplary data is amenable to the model modification as well as the parameter modifications for reducing noise in the extraction process.

Figures 15A, 15B:
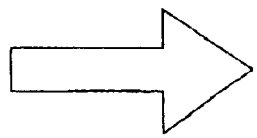
FIG. 15A illustrates an exemplary font-size point table whose point values are reduced to ones shown in FIG. 15B.

FIGS. 15A and 15B illustrate acts of selecting the best candidate line based an extraction confidence value and updating a point table. Assuming that the extraction confidence values for candidates No. 1 through No. 4 are respectively 100, 90, 50 and 40, if a cut-off value were 85 for reducing noise in the element extraction, the candidates Nos.

1 and 2 would be selected and the candidates Nos. 3 and 4 are rejected. On the other hand, if the cut-off value in the extraction confidence value were 30, all of the candidates Nos. 1 through 4 would be selected. Now if the font size values vary in the historical information, points in a font-size point table as shown in FIG. 15A are reduced to ones shown in FIG. 15B. Contrarily, points are increased if the font size values are consistent.

To determine whether or not to generate multiple templates, one exemplary set of criteria is illustrated below. First, for each element, a weight coefficient is determined based upon the extraction confidence value and relative coordinates. Secondly, an average weight coefficient es is determined for the extraction confidence value. Lastly, if the average weight coefficient es exceeds a predetermined threshold value, multiple templates are to be generated. The weight coefficient based upon the relative coordinates becomes large as the element is emphasized in layout. The extraction confidence value is an index for accurate extraction.

It is to be understood, however, that even though numerous characteristics and advantages of the present invention have been set forth in the foregoing description, together with details of the structure and function of the invention, the disclosure is illustrative only, and that although changes may be made in detail, especially in matters of shape, size and arrangement of parts, as well as implementation in software, hardware, or a combination of both, the changes are within the principles of the invention to the full extent indicated by the broad general meaning of the terms in which the appended claims are expressed.

What is claimed is:

1. A method of extracting one or more elements from a document using model data, the model data including at least a template, comprising:
   a) determining the template for a predetermined document type, the template having a set of predetermined characteristics for each of the elements;
   b) inputting at least one input document;
   c) extracting the elements having the predetermined characteristics from the input document according to the model data;
   d) storing the extracted characteristics of the elements in the model data;
   e) determining a distance value between the stored characteristics and a corresponding one in the model data;
   f) determining a variable amount based upon the distance value for each of the element; and
   g) modifying the model data based upon the variable amount.

2. The method of extracting an element of claim 1 wherein the model data is selected from a plurality of sets of the model data.

3. The method of extracting an element of claim 2 wherein the variable amount is determined for each of the characteristics for each of the elements based upon a comparison of the characteristic of the model data and the corresponding stored characteristics of the input document which has the closest characteristics to that of the model data.

4. The method of extracting an element of claim 3 wherein the characteristic in the model data is modified based the variable amount of the corresponding one of the stored extracted characteristics.

5. The method of extracting an element of claim 4 wherein the characteristic is modified if the variable amount is above a first predetermined threshold value.

6. The method of extracting an element of claim 4 wherein the model data is modified by adding a new template if the variable amount is above a second predetermined threshold value.

7. The method of extracting an element of claim 4 wherein the model data additionally includes a noise reduction potential index (NI) for each of the elements.

8. The method of extracting an element of claim 1 wherein the characteristics includes a coordinate, a font size and a font type.

9. The method of extracting an element of claim 4 wherein a predetermined set of extraction parameters in the model data is modified based upon an extraction confidence value and an adjacent area similarity value if the variable amount is below a third predetermined threshold value.

10. A system for extracting one or more elements from a document using model data, comprising:
    a model generation unit for generating model data for a predetermined document type, the model data including at least a template, the template having a set of predetermined characteristics for each of the elements;
    a document input unit for inputting at least one input document;
    an element extraction unit connected to said model generator and said document input unit for extracting the elements having the predetermined characteristics from the input document according to the model data;
    a characteristics storage unit connected to said element extraction unit for storing the extracted characteristics of the elements in the model data;
    a learning process unit connected to said characteristics storage unit for determining a distance value between the stored characteristics and a corresponding one in the model data and for determining a variable amount based upon the distance value; and
    a model updating unit connected to said learning process unit and said model generation unit for modifying the model data based upon the variable amount.

11. The system for extracting an element of claim 10 wherein said model generation unit generates a plurality of sets of the model data and further comprising a model selection unit connected to said model generation unit for selecting one of the sets of the model data.

12. The system for extracting an element of claim 11 wherein said learning process unit determines the variable amount for each of the characteristics for each of the elements based upon a comparison of the characteristic of the model data and the corresponding stored characteristics of the input document which has the closest characteristics to that of the model data.

13. The system for extracting an element of claim 12 wherein said model updating unit modifies the characteristic in the template based the variable amount.

14. The system for extracting an element of claim 13 wherein said model updating unit modifies the characteristic if the variable amount is above a first predetermined threshold value.

15. The system for extracting an element of claim 13 wherein said model updating unit modifies the model data by adding a new template if the variable amount is above a second predetermined threshold value.

16. The system for extracting an element of claim 13 wherein the model data additionally includes a noise reduction potential index (NI) for each of the elements.

17. The system for extracting an element of claim 10 wherein the characteristics includes a coordinate, a font size and a font type.

18. The system for extracting an element of claim 13 wherein the model data includes a predetermined set of extraction parameters, the extraction parameter being modified based upon an extraction confidence value and an adjacent area similarity value if the variable amount is below a third predetermined threshold value.

* * * * *